United States Patent [19]
White

[11] Patent Number: 4,719,333
[45] Date of Patent: Jan. 12, 1988

[54] FIRING OF CERAMIC WARE

[75] Inventor: Philip J. White, Staffordshire, United Kingdom

[73] Assignee: Portmeirion Potteries, Limited, England

[21] Appl. No.: 702,839

[22] Filed: Feb. 19, 1985

[51] Int. Cl.⁴ .............................................. A21B 1/00
[52] U.S. Cl. .................... 219/400; 432/202; 34/68; 34/218
[58] Field of Search ............... 34/68, 196, 195, 218, 34/219; 126/21 A; 219/400; 432/199, 202, 203, 59, 120, 130, 144

[56] References Cited

U.S. PATENT DOCUMENTS

| | | | |
|---|---|---|---|
| 3,548,153 | 12/1970 | Kells | 126/21 A X |
| 3,782,892 | 1/1974 | Johnson et al. | 126/21 A X |
| 4,005,981 | 2/1977 | Turnbull | 432/144 |
| 4,154,576 | 5/1979 | Bossetti | 432/130 X |
| 4,216,592 | 8/1980 | Koch | 34/68 |
| 4,374,319 | 2/1983 | Guibert | 126/21 A X |
| 4,395,233 | 7/1983 | Smith et al. | 219/400 X |
| 4,518,352 | 5/1985 | Gilhaus et al. | 432/199 |
| 4,531,910 | 7/1985 | Geil | 432/120 |
| 4,535,226 | 8/1985 | Logel et al. | 219/400 |
| 4,536,153 | 8/1985 | Anthony | 219/400 X |
| 4,591,517 | 5/1986 | Whipple | 432/59 X |

FOREIGN PATENT DOCUMENTS 844099 8/1960 United Kingdom ................ 219/400

Primary Examiner—Robert L. Spruill
Assistant Examiner—Steven P. Weihrouch
Attorney, Agent, or Firm—W. Thad Adams, III

[57] ABSTRACT

An electrically heated kiln (10) for firing ceramic ware has centrifugal fans (22) communicating with a lower region of the kiln, the fans (22) pulling atmospheric air from externally of the kiln through electric heaters (24) so that heated air is introduced into the kiln to create an air flow which passes around the ware. The air then escapes through dampers (14) at an upper region of the kiln (10). In this way the electric heating elements (16) of the kiln (10) do not require to heat the ware up to such a high temperature as is conventional in order to burn off organic binders under which transfers for the ware are printed and the contaminated air can escape through the dampers (14) to effect a regular complete change of the air within the kiln (10). Alternatively where undecorated ware is to be fired the air within the kiln (10) does not become contaminated and can be recirculated to be introduced by the fans (22) at the lower region of the kiln (10). The efficiency of the kiln is therefore improved while still retaining the advantages of electrical heating.

11 Claims, 1 Drawing Figure

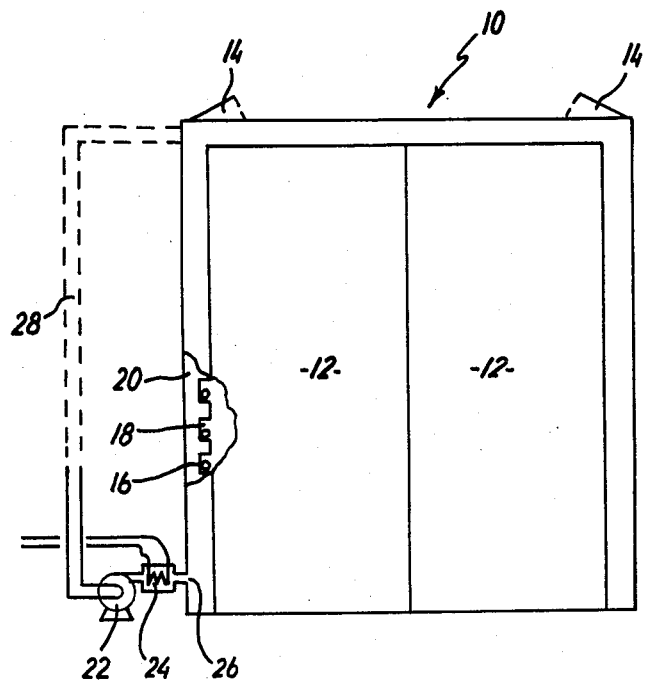

FIRING OF CERAMIC WARE

The invention relates to a method and apparatus for firing ware especially, though not exclusively, decorated ceramic ware, in electrically-heated intermittent kilns.

It is known to fire ceramic ware, particularly decorated ceramic ware, in electrically-heated intermittent kilns since they offer a number of advantages over gas-fired kilns. A principal advantage is that there are no combustion products such as water vapour, deposition of which may adversely affect the finished product by causing the latter to have a dull or obliterated finish. Further, the turbulent atmosphere caused by gas burners can lead to a contamination problem as even quite small amounts of dust in the kiln can be deposited on the ware. Quite stringent controls on cleanliness are necessary to avoid problems.

Decorated ware is commonly made either by expensive application of a pattern by hand, or by the use of transfers. Such transfers are overprinted with an organic covercoat of binder material which is transferred as a whole to the ware, the unwanted binder being burnt off at about 250° C. during the initial stages of firing the ware, to leave ony the desired pattern. Electric kilns have certain disadvantages, however, since the heat is produced by electric heating elements, these being generally ranged along the side walls of the kiln so that the interior of the kiln is substantially free of obstructions for ease of loading and unloading of the ware. Such elements radiate heat in all directions, some being lost in heating the walls of the kiln, especially at start-up. The heat produced is less directionally propogated than in gas kilns, where the gas is issued from jets towards the ware. Because of this and the requirement that the kiln should have an open interior, it is often necessary to heat the kiln up to a temperature of about 400° C. in the region of the heating elements, i.e. at the walls, to make sure that the ware in the centre of the kiln is heated up to about 250° C. as required for burning-off the transfer binder. This is unnecessarily wasteful of heat. The rate of increase of temperature of the air in the kiln by the heating element depends on the size of the kiln and its shape. Typically a figure of 150° C. per hour is used. If the kiln is heated up too quickly then the temperature gradient across the kiln between the walls and the centre is too great, resulting in incomplete burning off of the binder on the ware towards the centre of the kiln and disturbance of the transfers on ware near the wall of the kiln.

According to the present invention, there is provided a method of firing ware in an intermittent kiln, said method comprising initially firing the ware to substantially a predetermined temperature by simultaneously, and at the one location, applying radiant heat from electric heating means and introducing heated air into the kiln so as to create air flow around the ware, removing the air, and subsequently completing firing at said location by the continued application of radiant heat from the electric heating means.

Preferably the heated air is derived from the atmosphere externally of the kiln, and the air from the atmosphere is heated electrically before being introduced to the kiln. Preferably also the air is removed from the kiln by opening dampers thereof when the heated air is being introduced.

Alternatively, however, if decorated ware is not being fired, the air to be blown into the kiln may be derived from the interior of the kiln. With decorated ware, air derived from the interior of the kiln will be contaminated by burnt binder combustion products, and therefore it is not desirable to use hot recycled air from the kiln when decorated ware is being fired. If the air is recirculated from the kiln through the blower back into the kiln then little or no extra heating will be required. Desirably the method comprises the steps of activating the heating elements of the kiln and blowing heated air into the kiln whilst the kiln dampers are open, until all the organic binder material is burnt away, whereupon the heated air is terminated and the dampers closed, firing continuing until the ware is properly fired.

After firing has been completed and the supply of electricity to the kiln heating elements is cut off, unheated air may be blown into the kiln to speed up the cooling process.

The invention also provides an intermittent kiln for firing of ware, the kiln comprising electric heating means for supplying radiant heat to the ware both during initial firing of the ware to substantially a predetermined temperature and subsequent completion of firing, means for introducing heated air into the kiln at the location of the electric heating means during the initial firing so as to create air flow around the ware, and means enabling removal of the air.

Preferably the means for introducing air comprises a fan for atmospheric air and heating means for the air downstream of the fan, and the means enabling removal of air from the kiln comprises one or more openable dampers.

Alternatively, a recirculation arrangement interconnects the means for introducing heated air and the means for enabling subsequent removal of the air.

Because the air is turbulent within the kiln the rate of heating the kiln may be increased to, for example 200° C. per hour without adversely affecting the temperature gradient. Thus the kiln heats up much quicker and, if cool air is blown in after firing, cools down much quicker enabling more firings to be made in a given time. The heating elements of the kiln can be used to bring the temperature up to a little over 250° C., the entire contents of the kiln being heated to this level, so that there is little or no temperature gradient within the kiln. This results in a great saving of energy.

An embodiment of the invention will now be described by way of example only with reference to the accompanying schematic drawing, the single FIGURE of which shows the arrangement of apparatus according to the invention.

The drawing shows a kiln 10 having end loading doors 12 and dampers 14 which are openable to release air from the interior of the kiln. The kiln is heated by electric heating elements 16 received in horizontal recesses 18 in the kiln walls 20. A centrifugal fan 22 is provided at each end at a lower region of the kiln, and is operable to blow air across an electric heating element 24 into the kiln through an inlet 26, the air preferably being derived from the atmosphere externally of the kiln. If, however, the kiln is to be used for firing unpatterned ceramic ware then the air input to the centrifugal fan may be derived from the air inside the kiln preferably from an upper hot region thereof as shown by the hatched line 28. The electric heating element 24 is preferably controlled by appropriate switch gear energized from any suitable electric source, and may be switched off if hot air from the kiln is recycled.

In operation of the kiln, ware is loaded through the end doors 12 to the kiln and the doors are closed. The electric heating elements 16 are energized and the temperature raised. The centrifugal fans 22 are energized and the heating elements 24 are switched on to heat the air blown by the fans 22 to inlet 26. The centrifugal fans achieve a complete change of the air within the kiln every one and a half minutes, the contaminated air escaping through the dampers 14 which are open at this stage of the procedure. When the temperature within the kiln has reached about 250° C. and all the organic binder has burnt off, the centrifugal fans 22 and the electric heating elements 24 are switched off and the dampers closed whereupon firing of the ceramic ware is completed in the normal way.

When firing is completed and the electric heating elements 16 have been switched off, the centrifugal fans 22 are energized and dampers 14 opened to blow unheated air through the kiln so aiding cooling of the ware.

The apparatus enables the ware to be fired in less time than the conventional kiln, so more firing may be carried out in a given time. Also because the electric heating elements do not need to heat the ware up to 400° C. or thereabouts to burn off all the binder a saving in energy is achieved.

Various modifications may be made within the scope of the invention, for example the number of centrifugal fans and heating elements 24 may be chosen to suit the size and shape of the kiln.

In a typical example, an electric intermittent kiln of size 10'×10'×20' was vented for two and a half hours from ambient temperature until 400° C. was reached, i.e. with the dampers open. With the apparatus according to the invention the dampers may be closed after one and a half hours, the electric heating elements 24 being rated 18 kw, and the centrifugal fans and elements 24 each producing approximately 100 cubic feet per minutes of air at 300° C., atmospheric air being supplied from outside the kiln.

Where two or more kilns are in operation, heated air being vented from one kiln cooling down may be blown into another kiln which is being heated up.

In addition the heated air could be continually introduced throughout firing where different heating elements are used.

I claim:

1. A method of firing ware in an intermittent kiln, said method comprising initially firing the ware to substantially a predetermined temperature by simultaneously applying radiant heat from electric heating means within the kiln, heating air from externally of the kiln by means of a heat source independent of the kiln heating means, and introducing the heated air into the kiln so as to create heated air flow around the ware, removing the air, and subsequently completing firing by a continued application of radiant heat from the electric heating means.

2. A method according to claim 1, wherein the air which is heated externally of the kiln is heated electrically before being introduced to the kiln.

3. A method according to claim 1, wherein the air is removed from the kiln by opening dampers thereof when heated air is being introduced.

4. A method according to claim 1, wherein, subsequent to introducing heated air from externally of the kiln, the air which is heated externally of the kiln is derived from the interior of the kiln by a recirculation arrangement which also provides for the subsequent removal of the air from the kiln.

5. A method according to claim 1, wherein unheated air is introduced into the kiln after firing has been completed.

6. An intermittent kiln for firing of ware, the kiln comprising electric heating means within the kiln for supplying radiant heat to the ware both during initial firing of the ware to substantially a predetermined temperature and subsequent completion of firing, a heat source independent of the kiln heating means, means for introducing air from externally of the kiln to the heat source, means for introducing the heated air into the kiln at the location of the electric heating means during the initial firing so as to create air flow around the ware, and means enabling removal of the air.

7. A kiln according to claim 6, wherein the means for introducing air comprises a fan for atmospheric air, the heat source being downstream of the fan.

8. A kiln according to claim 7, wherein the fan is a centrifugal fan.

9. A kiln according to claim 6, wherein the means enabling removal of air from the kiln comprises one or more openable dampers.

10. A kiln according to claim 6, wherein the means for introducing heated air into the kiln communicates with a lower region of the latter and the means enabling subsequent removal of the air is provided at an upper region of the kiln.

11. A kiln according to claim 6, wherein a recirculation arrangement interconnects with the heat source.

* * * * *